Patented Dec. 5, 1950

2,533,017

UNITED STATES PATENT OFFICE 2,533,017

RECLAIMING SYNTHETIC RUBBER

Theodore A. Johnson and Harry H. Thompson, Akron, Ohio, assignors to Wingfoot Corporation, Akron, Ohio, a corporation of Delaware No Drawing. Application December 12, 1946, Serial No. 715,639

1 Claim. (Cl. 260—2.3)

This invention relates to the reclaiming or regeneration of synthetic rubber and, more particularly, to the reclaiming or regeneration of diene synthetic rubbers.

There are, of course, a larger number of processes and variations thereof for reclaiming natural rubber. With the widespread use of synthetic rubbers, necessitated by the cutting off of our crude rubber supplies during the recent war, it became necessary to find suitable processes for reclaiming or regenerating these synthetic rubbers. This constituted a serious problem and it was unfortunately found that these rubbers could not be reclaimed by merely processing them in the same manner which had been commercially used for natural rubber. For example, when a diene rubber prepared by copolymerizing a diene, such as butadiene-1,3, with another polymerizable material, such as styrene or acrylonitrile, is subjected to the usual alkali process for reclaiming natural rubber, the product, while devulcanized, is not a smooth, uniform, usable material. A principal object of the present process is to further treat such devulcanized diene rubbers so as to put them in satisfactory condition for use. It is used to particular advantage in conjunction with the alkali process of reclaiming.

According to the practice of the invention, scrap articles made from a diene rubber are ground, cooked, washed, and dried according to one of the usual processes for the reclaiming of natural rubber, such as the well-known alkali or acid processes. This devulcanized material is then masticated, for example on a mill or in an internal mixer and, during the mechanical working, polyethylene glycol is added and worked into the rubber, and the mixture is masticated until a smooth mass of the desired degree of plasticity is obtained.

As an illustration of the practice of the invention, scrap tires made from GR–S (a copolymer of butadiene-1,3 and styrene) are devulcanized by the standard alkali process. The devulcanized, dried material is then placed on an apron mill and about one and a half percent by weight of a polyethylene glycol is added to the bank on the mill and the mass is worked for about fifteen minutes. It is then strained and refined in the usual manner, a single pass on the refiner usually being sufficient. The product so obtained is a very smooth, uniform, coherent sheet, free from lumps and of very satisfactory quality.

The polyethylene glycols are a well-recognized group of compounds. They may be formed from the reaction of ethylene glycol and ethylene oxide in varying proportions. They are ether-alcohols. Thus, diethylene glycol, which boils about 250° C., has the formula $O(CH_2CH_2OH)_2$ and triethylene glycol, which boils about 287° C., has the formula $OHCH_2CH_2OCH_2CH_2OCH_2CH_2OH$. While the individual compounds may be used, mixed polyethylene glycols may also be employed and thus it is not necessary to separate a mixed product into its components. Such mixed polyethylene glycols are commercially available materials. Those of lower molecular weight are liquids; those of higher molecular weight are waxy solids.

The time of working may vary considerably, depending upon the selection of polyethylene glycol, the particular stock being treated, the extent of the prior devulcanization treatment and other factors, but the time required to obtain a coherent sheet of the desired smoothness and plasticity can be readily determined for any particular case.

The quantity of polyethylene glycol may also be varied considerably. Small quantities from about one percent to five percent are ordinarily sufficient.

While the process may be used to advantage with various diene rubbers, such as copolymers of butadiene-1,3 with styrene or acrylonitrile, it is particularly useful with styrene-butadiene-1,3 rubber, such as that known as GR–S.

The process is also applicable to blends or mixtures of such diene rubbers with other materials, including natural rubber.

We claim:

A process for reclaiming a vulcanized rubber-like copolymer of butadiene-1,3 and styrene, which comprises subjecting the copolymer to the alkali process for reclaiming natural rubber and thereafter masticating the copolymer with from about one to five percent of a polyethylene glycol.

THEODORE A. JOHNSON.
HARRY H. THOMPSON.

REFERENCES CITED

The following references are of record in the file of this patent:

UNITED STATES PATENTS

| Number | Name | Date |
|---|---|---|
| 2,386,707 | Moore et al. | Oct. 9, 1945 |

OTHER REFERENCES

Ludwig et al., India Rubber World, vol. III, No. 2 (Nov. 1944), pages 180–186.

Gillman, Rubber Age, March 1946, pp. 709–14.